(12) United States Patent
Cabanas

(10) Patent No.: US 7,779,951 B1
(45) Date of Patent: Aug. 24, 2010

(54) PROCESS FOR BUILDING THE REAR PORTION OF A MOTORCYCLE

(76) Inventor: Victor Cabanas, 8030 NW. 159 Ter., Miami, FL (US) 33016

( * ) Notice: Subject to any disclaimer, the term of this patent is extended or adjusted under 35 U.S.C. 154(b) by 284 days.

(21) Appl. No.: 12/017,011

(22) Filed: Jan. 19, 2008

(51) Int. Cl.
    *B62K 11/04* (2006.01)
(52) U.S. Cl. ..................................... 180/219
(58) Field of Classification Search ........... 180/219
    See application file for complete search history.

(56) References Cited

U.S. PATENT DOCUMENTS

| | | | | |
|---|---|---|---|---|
| 5,845,728 | A * | 12/1998 | Itoh et al. | 180/219 |
| 5,975,230 | A * | 11/1999 | Bourget | 180/225 |
| 6,679,347 | B2 * | 1/2004 | Iimuro | 180/219 |
| 6,695,089 | B2 * | 2/2004 | Adachi et al. | 180/311 |
| 7,497,455 | B2 * | 3/2009 | Kamalian | 280/281.1 |
| 2006/0290094 | A1 * | 12/2006 | Kamalian | 280/274 |

* cited by examiner

*Primary Examiner*—Lesley Morris
*Assistant Examiner*—Michael R Stabley
(74) *Attorney, Agent, or Firm*—Sanchelima & Associates, P.A.

(57) ABSTRACT

A rear assembly for motorcycles having a frame with two rear parallel and spaced apart backbone members. Two molded halves of the rear portion are made from moldable sheet metal and welded together defining a seat side with an adjacent fender, as a unitary piece with an underside and a continuous peripheral edge. The edge is welded to the rear backbone members resulting in a braced structure. The process includes the steps of cutting two pieces of sheet metal with a predetermined shape that after being molded and welded together define an upper rear portion with a peripheral edge that is welded to the rear backbone members of the frame. Finishing steps including polishing and painting the resulting structure.

1 Claim, 2 Drawing Sheets

PROCESS FOR BUILDING THE REAR PORTION OF A MOTORCYCLE

BACKGROUND OF THE INVENTION

1. Field of the Invention

The present invention relates to a process for building the rear portion of a motorcycle and the resulting article of manufacture, and more particularly, to such a process that results in a rear portion of a motorcycle that is unitary in construction, as a single piece, and the article of manufacture itself.

2. Description of the Related Art

Several designs for motorcycles have been designed in the past for rear fenders and seat assemblies. None of them, however, are manufactured with a process that welds an entire molded rear portion to the motorcycle frame resulting in a unitary rear portion. This process has many benefits, in addition to shortening the time and expense of manufacturing the articles, such as resulting in a noiseless unitary piece. The number of parts that need to be inventoried is also minimized. The resulting rear portion provides a unique long lasting article of manufacture that is not susceptible to squeaking noises nor the loosening of parts.

Applicant believes that the closest reference corresponds to U.S. publication No. 2006/0290094 A1 issued to Kamalian on Dec 28, 2006 for a carbon fiber motorcycle frame. Kamalian discloses the use of a carbon fiber material and method for adding elements to a frame such as the fender and seat. See claim 22 and paragraph 46. Kamalian acknowledges the desirability of frames with few joints but it teaches away from using metal. However, it differs from the present invention because it uses carbon fiber, which is not as strong structurally as steel. While the unitary objective can be accomplished the resulting structure is obviously weaker than if it had been metal. Kamalian discloses in paragraph 0054 the use of various layers of fiber to strengthen the structure thereby undermining the claimed advantage of low cost and weight. The present inventor, on the other hand, utilizes moldable steel sheets that are formed to create a unitary piece that is welded to conventional metal frames. This method of building the rear portion of motorcycles is not known.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a process for building the rear portion of a motorcycle as a unitary piece that includes the rear fender and seat assembly.

It is another object of this invention to provide such a process that can be readily implemented without requiring specialized tools.

It is yet another object of this invention to provide such a process that is inexpensive to practice while retaining its cost effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
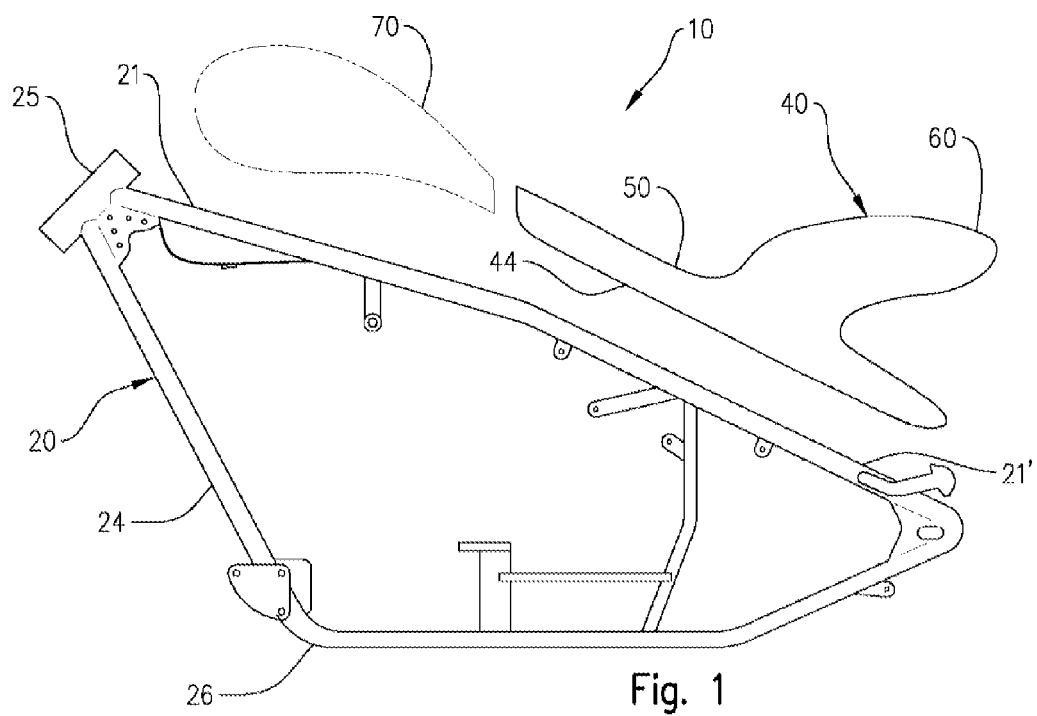
FIG. 1 is a side elevational view of a rear portion assembly 40 being mounted to motorcycle frame assembly 20.
Figure 2:
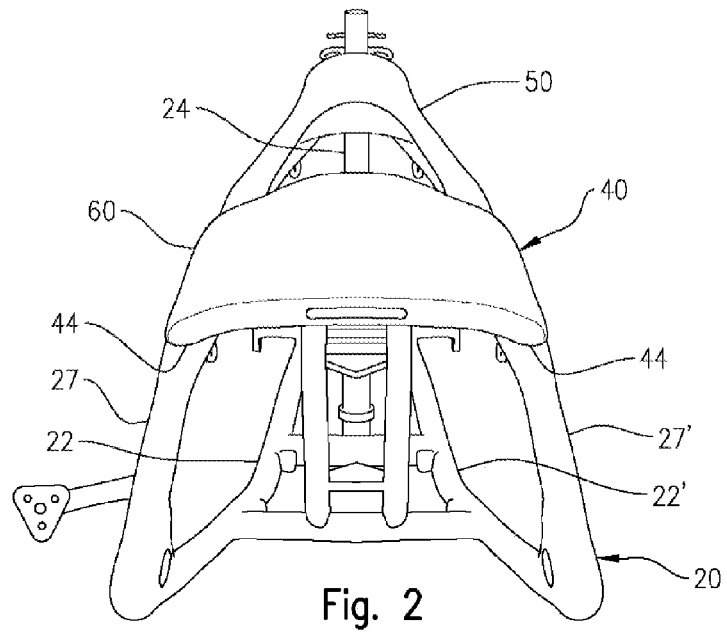
FIG. 2 is an elevational view of the rear portion of a motorcycle resulting from this process.
Figure 3:
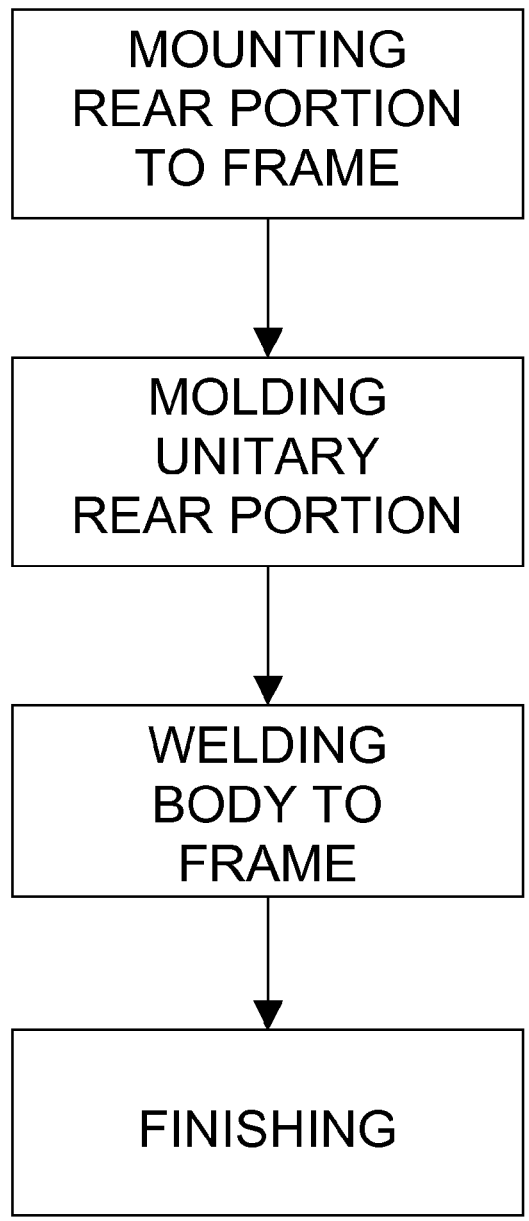
FIG. 3 represents a flow chart showing the main process steps.

Referring now to the drawing, where the present invention is generally referred to with numeral 10, it can be observed that it basically includes unitary metal frame assembly 20 for motorcycles having front and rear ends, 21 and 21', respectively, also known as backbone members and two longitudinally symmetrical halves 22 and 22' defining a central plane between them. Halves 22 and 22' include elongated rigid members 27 and 27', respectively, that have substantially the same dimensions and shape and run at a parallel and spaced apart relationship with respect to each other. Frame assembly 20 also includes down tube 24 that longitudinally extends along the frame's central plane between upper end 25 and lower end 26.

Rear portion assembly 40 is molded on a sheet metal piece, in the preferred embodiment, of suitable gauge, preferably no greater than 18 gauge. Assembly 40 includes a forward seat portion 50 and a rear fender portion 60, integrally built from the same piece. Assembly 40 includes an underside 42 with cooperative dimensions along the edges 44 to coincide with longitudinally extending rigid members 27 and 27'. Edges 44 are continuously welded to members 27 and 27' to brace the latter in a structurally stable disposition while achieving the characteristics of unitary piece.

A gas tank assembly 70 is mounted between upper end 25 and assembly 40. Assembly 70 has cooperative dimensions to fit between end 25 and the forward end of assembly 40.

The process for building the rear portion of a motorcycle includes cutting a sheet metal piece in a predetermined shape and molding a seat portion 50 and an adjacent rear fender portion 60. On a piece of sheet metal having an 18 gauge thickness (approximately) to achieve the necessary strength while still permitting sufficient moldable detail to achieve the desired shapes.

The next step involves conditioning the edges 44 of rear portion 40 so that it substantially coincides with the upperside of members 27 and 27' and the edges are suitable for welding.

Then, edges 44 around the periphery of the underside 42 are continuously welded to members 27 and 27' resulting in a completely braced unitary motorcycle rear.

Finally, after welding, finishing operations permit the painting of the welded parts making it look as one piece.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A process for building the rear assembly of a motorcycle, comprising the steps of:

A) cutting two sheet metal pieces in a predetermined shape

B) molding two halves of a rear portion with first cavity for a seat portion and an adjacent second cavity for a fender portion having each an underside defining a peripheral edge;

C) welding said halves to form said rear portion;

D) welding said peripheral edges to the upperside of the rear of a motorcycle frame to achieve a unitary construction; and E) finishing said assembly with polishing, priming, and painting steps.

\* \* \* \* \*